United States Patent [19]

Tarumi et al.

[11] 4,435,066
[45] Mar. 6, 1984

[54] ION MODULATING ELECTRODE WITH IMPROVED TRANSMISSION FACTOR

[75] Inventors: Noriyoshi Tarumi, Hachioji; Haruo Iwahashi, Fussa; Masahiko Matsunawa; Hiroshi Tokunaga, both of Hachioji, all of Japan

[73] Assignee: Konishiroku Photo Industry Co., Ltd., Tokyo, Japan

[21] Appl. No.: 355,878

[22] Filed: Mar. 8, 1982

[30] Foreign Application Priority Data

Mar. 16, 1981 [JP] Japan .................................. 56-36489
Mar. 16, 1981 [JP] Japan .................................. 56-36490
Mar. 16, 1981 [JP] Japan .................................. 56-36491

[51] Int. Cl.³ .......................................... G03G 15/00
[52] U.S. Cl. .................................. 355/3 SC; 430/53; 358/300; 101/DIG. 13
[58] Field of Search ............ 355/3 SC, 14 CH, 3 CH, 355/3 R; 430/53, 68; 358/300; 101/DIG. 13

[56] References Cited

U.S. PATENT DOCUMENTS

| | | | |
|---|---|---|---|
| 3,977,323 | 8/1976 | Pressman et al. | 355/3 SC |
| 4,014,694 | 3/1977 | Crane et al. | 355/3 SC |
| 4,090,876 | 5/1978 | Furuya et al. | 355/3 SC |
| 4,092,160 | 5/1978 | Jackson et al. | 355/3 SC |
| 4,099,863 | 7/1978 | Nakatsubo et al. | 355/3 SC |
| 4,168,164 | 9/1979 | Furuya et al. | 355/3 SC |

*Primary Examiner*—Richard L. Moses
*Attorney, Agent, or Firm*—Jordan B. Bierman; Linda Bierman

[57] ABSTRACT

An electrostatic reproducing apparatus, in which the ion flow passing through an ion modulating electrode and reaching a reproducing member is increased by strengthening the electric field between the electrode of the ion modulating electrode and the reproducing member. Ion transmissive apertures formed in the ion modulating electrode is made to have a larger diameter at its ion outlet than at its ion inlet so that the ion transmission factor may be improved. Condenser electric field generating means such as an electrode for generating an electric field to converge the ion flow toward the ion transmissive aperture of the ion modulating electrode is mounted on the common electrode of the ion modulating electrode at its inlet so that the ion flow of the ion generator using the corona wire may be highly dense.

4 Claims, 10 Drawing Figures

PRIOR ART  FIG. 1

INTENSITY OF ELECTRIC FIELD BETWEEN
CONTROL ELECTRODE AND RECORDING MEMBER

ION MODULATING ELECTRODE WITH IMPROVED TRANSMISSION FACTOR

BACKGROUND OF THE INVENTION

1. Field of the Invention

The present invention relates to an electrostatic reproducing apparatus in which the ion transmission factor of an ion flow modulating electrode is enhanced to improve the reproducing speed.

2. Description of the Prior Art

An apparatus, in which the picture image signal of either the information generated by a computer, the information sent through communication lines or the information generated by converting the document image into electric signals by means of a solid state image sensor such as a CCD is reproduced on a sheet of reproducing paper, is known as an electrostatic reproducing apparatus, and its various types are proposed at present. In the electrostatic reproducing apparatus, an electrostatic latent image corresponding to the picture image signal is formed on a charge receptor such as a dielectric member or the reproducing paper. As one of the electrostatic latent image forming means, there is an electrostatic reproducing apparatus of the type, in which an ion flow modulating electrode for modulating the corona ions generated by a corona wire or the like in accordance with the picture image signal is used to form the electrostatic latent image on the dielectric member. FIG. 1 shows the schematic construction of one example of the electrostatic reproducing apparatus of the aforementioned type. As shown, either the picture image signal generated by photoelectrically converting the document image by means of a solid state image sensor such as the CCD or the electric information signal coming from a computer or communication lines is fed to a signal processing circuit 1, in which it is processed and is then fed to an ion flow modulating electrode drive circuit 2. Reference numeral 3 indicates a control circuit including a clock generator for imparting the timing at which the signal is derived from the signal processing circuit 1 and the drive circuit 2. An ion flow modulating electrodes 4 is constructed by sandwiching an insulating layer between a common electrode 4a and a control electrode 4b and is formed with a plurality of ion transmissive apertures 4c which are arranged in one or plural rows, and the picture image signal is fed from the drive circuit 2 to the control electrode 4b. Above the ion flow modulating electrode 4, there is arranged a corona ion generator 5 which has a built-in corona wire 5a. Below the ion flow modulating electrode 4, on the other hand, there is arranged a rotary drum 6 which is made of a dielectric material. Around the periphery of the dielectric rotary drum 6, there are arranged a developing device 7, a transfer electrode 8, a separation pawl 9, a discharge electrode 10, a developing agent cleaning blade 11 etc., all of which are necessary for the usual electrophotographic processing. A fixing device 12 is also provided. The ions generated by the corona ion generator 5 are controlled in their flow rate by the picture image signal to transmit through the ion transmissive apertures 4c, which is applied to the control electrode 4b of the ion flow modulating electrode 4, so that an electrostatic latent image corresponding to the picture image information to be reproduced is formed on the dielectric member on the rotary drum 6. The electrostatic latent image thus formed is developed at the developing device 7 by means of a developing agent into a toner image, which is transferred to a sheet of reproducing paper P by the action of the transfer electrode 8. After that, the reproducing paper P is separated from the dielectric rotary drum 6 by the action of the separation pawl 9 and is fixed by the action of the fixing device 12 until it is discharged to the outside of the apparatus.

Here, by the electrostatic reproducing method using the ion flow modulating electrode thus far described, a high quality picture image having a high resolution and tonal response characteristics can be reproduced while maintaining the electrode and the electrostatic charge receptor such as the dielectric member non-contacting (i.e., spaced at 0.1 to 2.00 mm). However, there arises a problem that the reproducing speed is low partly (1) because there is a limit to the current density of the ions generated by the ion generator and partly (2) because there is a lower limit to the ion control time due to the ion mobility. Therefore, the electrostatic reproducing method thus far described is applied at most to a printer using an ink mist. With this in mind, the main current of the electrostatic reproducing system at present uses a multi-stylus electrode. In order to augment the ion flow reaching the reproducing unit, therefore, it is conceivable to provide a method in which the voltage to be applied to the corona wire is raised. In the case of the electrostatic reproducing apparatus using a screen photosensitive member when the ion flow to be generated by the corona wire is increased however, the ion flow reaching the reproducing unit is reduced, or the picture quality deteriorates because an electric field into which the ions are to flow is formed at the side of the screen photosensitive member. For this reason, an upper limit is set to the voltage to be applied to the corona wire. In the case of the electrostatic reproducing apparatus using the ion flow modulating electrode, on the other hand, the ion flow generated by the corona wire 5a is directed to the ion flow modulating electrode 4 along the electric field, which is generated by the potential difference between the voltage applied to the corona wire 5a and the voltage applied to both the common electrode 4a and the control electrode 4b, and its certain portion enters the ion transmissive apertures 4c. If the potential difference between the aforementioned common and control electrodes 4a and 4b so as to increase the ion flow to enter those ion transmissive apertures 4c, the electric field becomes such an equi-potential plane as is indicated at solid lines in FIG. 2, with the trajectory of the ions indicated by broken lines. If that potential difference is reduced, the ion flow to enter the ion transmissive apertures 4c is reduced and the ion flow to transmit therethrough is accordingly reduced. In order to increase the reproducing speed, therefore, it is necessary to raise the potential difference between the common electrode 4a and the control electrode 4b. In this case, a portion of the ion flow having entered the ion transmissive apertures 4c is caught by the insulating layer between the common and control electrodes 4a and 4b, and a considerable portion is attracted by the control electrode 4b (which has a thickness of about 20 $\mu$m) so that the transmission factor of the ion flow is reduced to a lower level than 10%. Here, the ion flow transmission factor means the ratio of the electric current due to the ion flow having transmitted through those ion transmissive apertures 4c to the electric current due to the ion flow having entered the ion transmissive apertures 4c of the ion flow modulating electrode.

In order to increase the reproducing speed of the electrostatic reproducing method using the ion flow modulating electrode, on the other hand, there has also been proposed a method which uses an ion generating source (which makes use of a high-frequency discharge and a spark discharge, for example) other than the ion generator using the corona wire. The apparatus according to the method proposed has more complicated structure than that using the corona wire. As another method, moreover, there has been proposed a method (which is disclosed in Japanese Patent Application No. 154,632/1980), in which a condenser electrode for converging the ion flow to enter the opening of the ion flow modulating electrode is provided, a method (which is disclosed in Japanese Patent Application No. 158,067/1980), in which the electrode layer of the ion flow modulating electrode at the side of the reproducing member is made thin so as to increase the ion transmission rate, or a method (which is disclosed in Japanese Patent Application No. 168,068/1980), in which an ion trajectory correcting electrode is interposed between the ion flow modulating electrode and the reproducing member.

SUMMARY OF THE INVENTION

In view of the background thus far described, therefore, it is an object of the present invention to provide an electrostatic reproducing apparatus, in which the ion flow to pass through an ion modulating electrode until it reaches a reproducing member is increased by strengthening or enhancing the electric field to be established between the electrode of the ion modulating electrode at the side of the reproducing member and the reproducing member.

Another object of the present invention is to provide an electrostatic reproducing apparatus, in which the ion transmitting apertures to be formed in the ion modulating electrode have a larger diameter at the ion outlet side than at the ion inlet side so that the ion transmission factor may be improved from a view point different from the aforementioned known and proposed methods, while considering the point that the reduction in the ion transmission factor is caused by the shape of the ion modulating electrode.

A further object of the present invention is to provide an electrostatic reproducing apparatus, in which condenser electric field generating means such as an electrode for generating an electric field to converge the ion flow toward the ion transmissive aperture of the ion modulating electrode is mounted on the common electrode of the ion modulating electrode at its inlet so that the ion flow of the ion generator using the corona wire may be highly dense.

The above object can be attained by an electrostatic reproducing apparatus comprising: an ion generator; an ion modulating electrode constructed of a continuous layer of conductive material and a segmented layer of conductive material, while sandwiching an insulating layer inbetween, and having a plurality of apertures so that the flow rate of the ions, which are generated by said ion generator and allowed to pass through said apertures, may be controlled by a picture image signal to be recorded; a recording means for maintaining the ions which have passed through said apertures; and an enhancing means for enhancing the ion transmission factor of said apertures.

The other objects and advantages of the present invention will become apparent from the following description taken in conjunction with the accompanying drawings.

DESCRIPTION OF THE PREFERRED EMBODIMENTS

Figure 1:
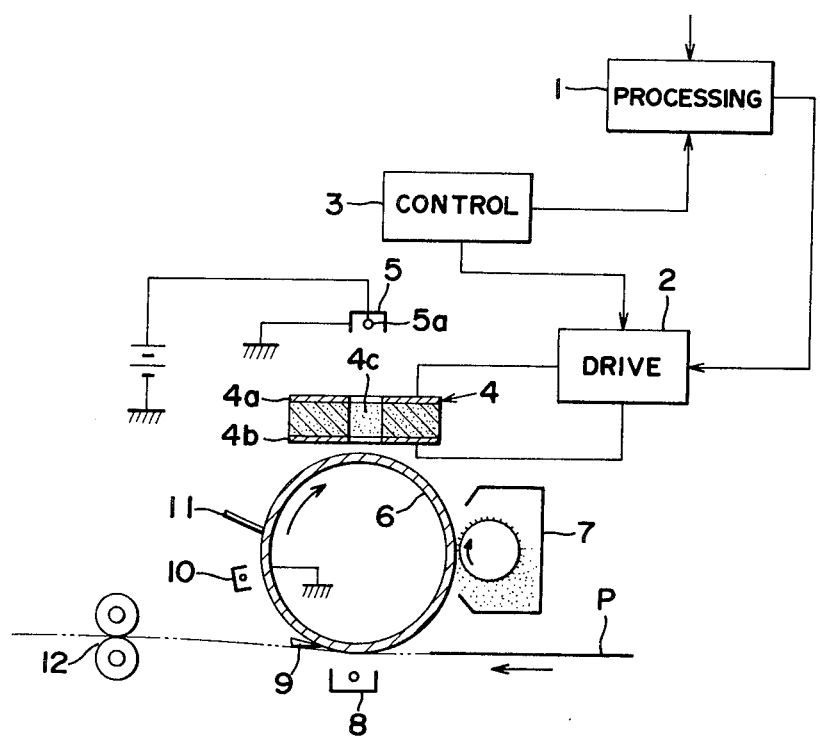
FIG. 1 is a schematic diagram showing the construction of an electrostatic reproducing apparatus using an ion modulating electrode according to the prior art.
Figure 2:
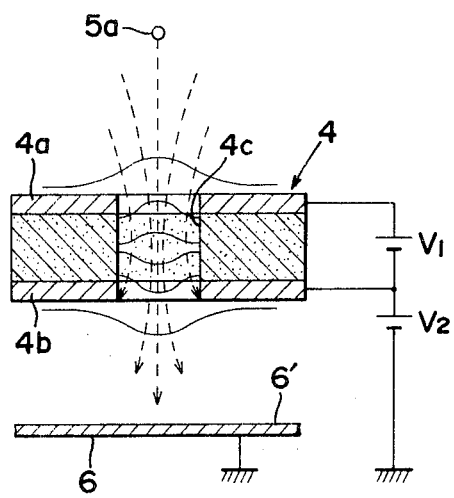
FIG. 2 is a circuit diagram showing the voltage applying circuit of the ion modulating electrode of an electrostatic reproducing apparatus according to the present invention.
Figure 3:
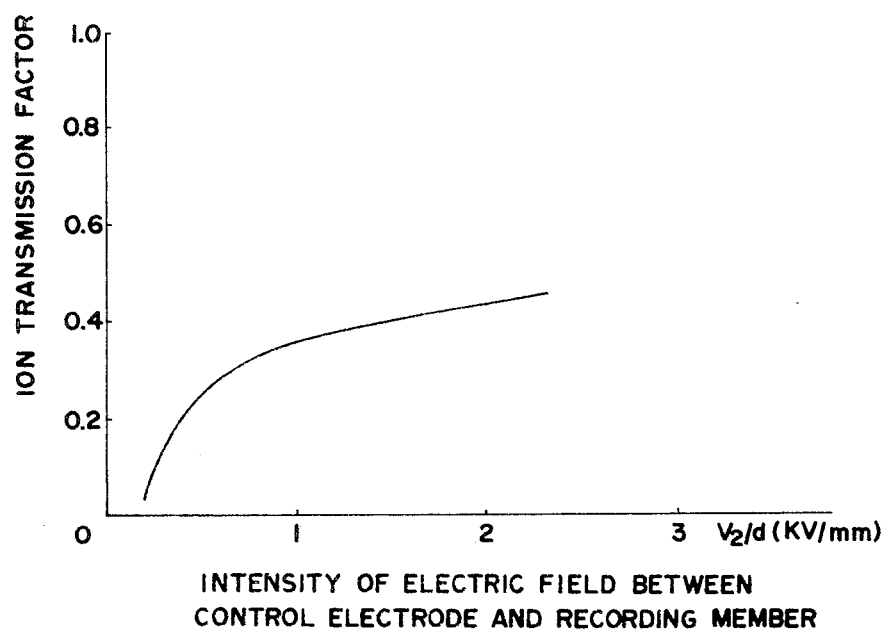
FIG. 3 is a graph illustrating the relationship between an applied voltage of the circuit shown in FIG. 2 and the ion transmission factor.

FIG. 2 shows both the ion modulating electrode 4 of the electrostatic reproducing apparatus according to the present invention and a voltage applying circuit for applying a voltage thereto. Reference character $V_1$ indicates a voltage which is applied between the continuous common electrode 4a and the segmented control electrode 4b, and character $V_2$ indicates a voltage which is applied between the control electrode 4b and a recording member 6'. In the circuit construction thus made, a the voltage $V_2$ is varied, the transmission factor of the ions transmitted through the ion transmissive aperture 4c of the modulating electrode 4 has been confirmed to vary, as shown in FIG. 3. As indicated, the ion transmission factor is greatly varied if the intensity of the electric field between the control electrode 4b and the recording member 6' is in the vicinity of 0.5 KV/mm. If the intensity of the electric field becomes greater than that level, the picture image to be formed on the recording member (or the electrostatic latent image formed on the charge receptor, more specifically) becomes sharp.

Thus, the ion flow transmitted through the ion modulating electrode is increased by strengthening the electric field, which is to be generated between the control electrode of the ion modulating electrode and the recording member or the charge receptor, from a prior art level of 0.2 to 0.4 KV/mm to a higher level than that value of 0.5 KV/mm. According to the present invention, the ion transmission factor can be further increased by making the control electrode of the ion modulating electrode less than 6 $\mu$m, for example. Although the description of the foregoing embodiment is directed to the ion modulating electrode, the fundamental technical concept of the present invention can be applied to a screen photosensitive member.

As has been described hereinbefore, according to the present invention, the ion transmission factor can be improved by strengthening the electric field, which is to be generated between the control electrode of the ion modulating electrode and the recording member, preferably not less than 0.5 KV/mm so that the reproducing speed can be improved.

Figure 4:
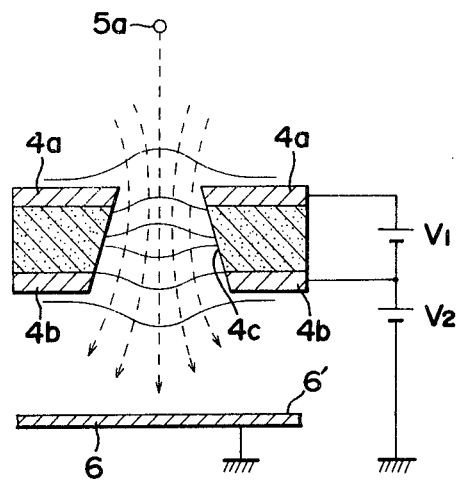
FIG. 4 is a schematic diagram showing the construction of the electrostatic latent image forming unit of the electrostatic reproducing apparatus according to another embodiment of the present invention.
Figure 5A:
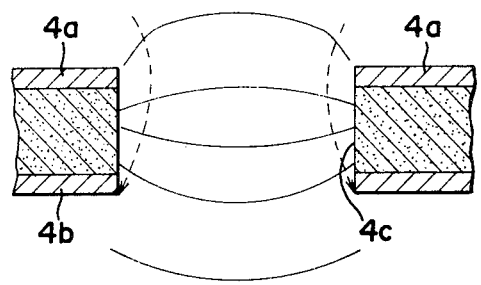
FIGS. 5(a) and 5(b) are schematic views for comparing the phenomena of generating an electric field at the ion modulating electrode.
Figure 5B:
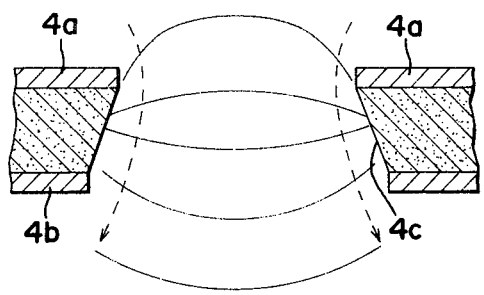

FIG. 4 shows another embodiment of the ion modulating electrode of the electrostatic reproducing apparatus according to the present invention, in which the ion transmitting aperture 4c formed in the ion modulating electrode 4 has a larger diameter at the side of the segmented control electrodes 4b, i.e., at the ion outlet side than that at the side of the continuous common electrode 4a, i.e., at the ion inlet side. As an example, in the ion modulating electrode in which the common and control electrodes 4a and 4b have a thickness of 5 μm and in which the insulating layer inbetween has a thickness of 25 μm, the ion transmissive aperture 4c is set to have a diameter of 70 μm at the side of the ion generator (i.e., the ion inlet) and a diameter of 100 μm at the side of the recording member (i.e., the ion outlet). Then, if the other conditions such as the voltage to be applied to the electrode is unchanged, it has been experimentally confirmed that the ion transmission factor is increased from a value of 25% in case the upper and lower diameters are equal to a value higher than 90%. This is believed to result from the fact that the electric field generated in the vicinity of the transmitting aperture and the ion trajectory is changed from that in the case of FIG. 5(a) to that in the case of FIG. 5(b) merely by changing the diameter of the ion transmitting aperture of the ion modulating electrode in the aforementioned manner. More specifically, the ion flow, which has been absorbed by the control electrode 4b according to the prior art, as shown in FIG. 5(a), is not absorbed to transmit at the side of the recording member, as shown in FIG. 5(b), so that the ion transmission factor is accordingly improved.

As has been described hereinbefore, according to the second embodiment of the present invention, since the diameter of the ion transmsissive aperture of the ion modulating electrode is made larger at the ion outlet side than at the ion inlet side, the ion flow allowed to pass through the transmitting aperture until it reaches the charge receptor can be increased so that the reproducing speed can be accordingly improved. As a result, an electrostatic reproducing apparatus of high speed can be realized and applied to a facsimile or a printer. In the present invention, moreover, the ions having passed through the ion modulating electrode may either be recorded as an electrostatic latent image on the charge receptor such as the photosensitive or dielectric member or be made to impinge upon the ink mist or the like thereby to charge the same so that they may be directly recorded as a visual image upon a sheet of electrostatically reproducing paper or the like.

Figure 6:
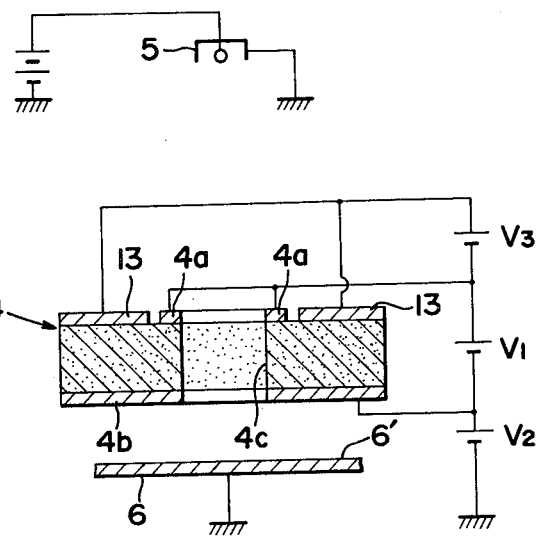
FIG. 6 is a schematic diagram showing the construction of the electrostatic latent image forming unit of the electrostatic reproducing apparatus according to a further embodiment of the present invention.

FIG. 6 shows a further embodiment of the present invention, in which an electric field generating electrode 13 electrically insulated from the continuous common electrode 4a is disposed on the same level as the common electrode 4a of the ion modulating electrode 4 is disposed at the side of the ion source, and in which the potential at the electrode 13 is increased by $V_3$ over that of the common electrode 4a, as shown, in case the ions generated by the corona ion generator 5 are positive. Electric field generating electrode 13 can be prepared by dividing a portion of the common electrode 4a and by electrically insulating the same.

Figure 7A:
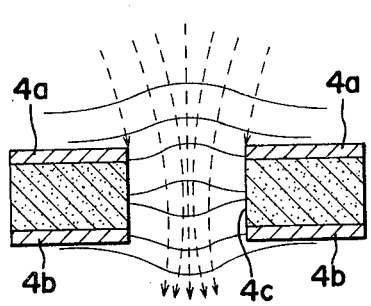
FIGS. 7(a) and 7(b) are explanatory views illustrating the phenomena of converting the ion flow from the point of forming the electric field.
Figure 7B:
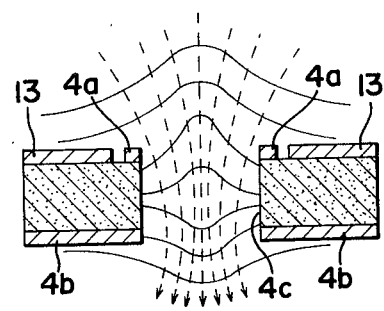

As a result, such an electric field as is shown in FIG. 7(b) is generated at the ion inlet side of the ion modulating electrode 4. FIG. 7(a) shows the pattern of the electric field which is generated at the ion inlet side of the ion modulating electrode in case the electric field generating electrode 13 is omitted. As is seen from FIG. 7(b), the ion flow is converged toward the transmitting aperture 4c by the electric field, which is generated in the vicinity of the common electrode 4a, so that the incidence rate of the ions is improved. If the potential $V_3$ is set at 200 to 300 V in the connections shown in FIG. 6, it has been confirmed according to experiments that the ion transmission factor increases about 1.5 to 2 times.

Figure 8:
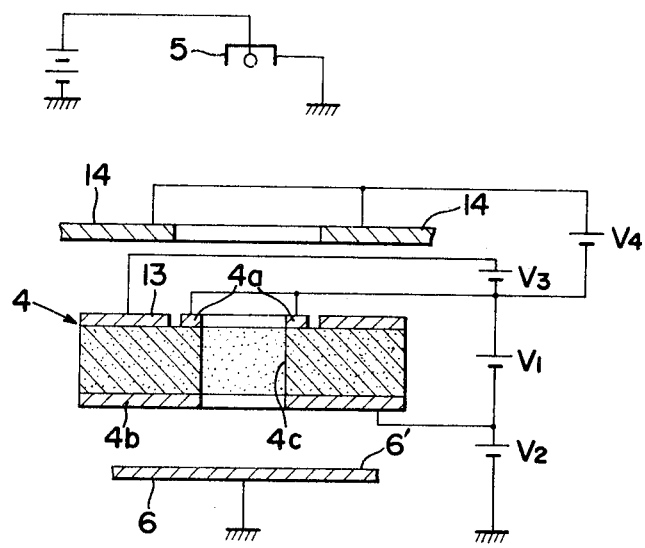
FIG. 8 is an explanatory view showing a further embodiment of the present invention.

As shown in FIG. 8, moreover, if an ion flow condenser electrode 14 is interposed between the ion modulating electrode 4 and the corona ion generator 5 and is set at such a potential as is greater by $V_4$ than that at the common electrode 4a, the ion incidence rate is further increased. If the potential $V_4$ is set at 200 to 300 V, for example, it has also been confirmed by the experiments that the ion incidence rate is increased by about 2 to 3 times.

As has been described hereinbefore, according to the embodiment thus far described, since the electrode for generating the electric field for converging the ion flow toward the transmissive aperture is disposed in the vicinity of the common electrode of the ion flow modulating electrode, which is disposed at the ion inlet side, the ion incidence rate is improved so that a highly dense ion flow can be established. As a result, the reproducing speed can be improved so that the electrostatic reproducing apparatus according to the present embodiment can be applied to an electrophotographic copier, a facsimile, a printer and so on.

What is claimed is:

1. An electrostatic reproducing apparatus comprising an ion generator, an ion modulating electrode constructed of a continuous layer of conductive material and a segmented layer of conductive material with an insulating layer sandwiched in between, and having a plurality of apertures so that the flow rate of the ions which are generated by said ion generator and allowed to pass through said apertures may be controlled by a picture image signal to be recorded, recording means for receiving the ions which have passed through said apertures, and means for enhancing the ion transmission factor of said apertures, said enhancing means generating an electric field of at least 0.5 KV/mm between the segmented layer of conductive material of said ion modulating electrode and said recording means.

2. An electrostatic reproducing apparatus comprising an ion generator, an ion modulating electrode constructed of a continuous layer of conductive material and a segmented layer of conductive material, with an insulating layer sandwiched in between and having a plurality of apertures so that the flow rate of the ions which are generated by said ion generator and allowed to pass through said apertures may be controlled by a picture image signal to be recorded, recording means for receiving the ions which have passed through said apertures, and means for enhancing the ion transmission factor of said apertures, said enhancing means including forming said ion transmitting apertures with a larger diameter at their ion outlets than at their ion inlets.

3. An electrostatic reproducing apparatus comprising an ion generator, an ion modulating electrode constructed of a continuous layer of conductive material disposed at the ion inlet side, and a segmented layer of conductive material disposed at the ion outlet side, with an insulating layer sandwiched in between, and having a plurality of apertures so that the flow rate of the ions which are generated by said ion generator and allowed to pass through said apertures may be controlled by a picture image signal to be recorded, recording means for receiving the ions which have passed through said apertures, and means for enhancing the ion transmission factor of said apertures, said enhancing means being disposed in the vicinity of the continuous layer of conductive material of said ion modulating electrode at the ion inlet side, thereby generating an electric field for converging the ions into said ion transmitting apertures.

4. An electrostatic reproducing apparatus according to claim 3, wherein said enhancing means is disposed on the same level as said continuous layer of conductive material.

* * * * *